L. D. HURD.
Car-Truck.

No. 205,390.      Patented June 25, 1878.

WITNESSES:
W. W. Hollingsworth
Solon C. Kemon

INVENTOR:
L. D. Hurd
BY
ATTORNEYS.

UNITED STATES PATENT OFFICE.

LORENZO D. HURD, OF WELLSVILLE, NEW YORK, ASSIGNOR OF ONE-SIXTH HIS RIGHT TO JAMES DEVLIN, OF WILLIAMSPORT, PENNSYLVANIA.

IMPROVEMENT IN CAR-TRUCKS.

Specification forming part of Letters Patent No. 205,390, dated June 25, 1878; application filed June 5, 1878.

*To all whom it may concern:*

Be it known that I, LORENZO D. HURD, of Wellsville, in the county of Allegany and State of New York, have invented a new and Improved Truck for Steam and Street Railways; and I do hereby declare that the following is a full, clear, and exact description of the same.

The object of my invention is to provide an improved truck for steam-railway and street cars, whereby the friction, resistance, and wear incident to passing around curves shall be reduced to a minimum, and the use of a pivot or fifth-wheel and a bolster avoided. This I effect by the construction and arrangement of parts hereinafter described, and illustrated in accompanying drawing, in which—

Figure 1:
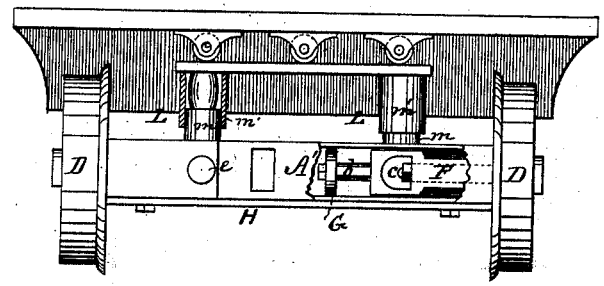
Figure 2:
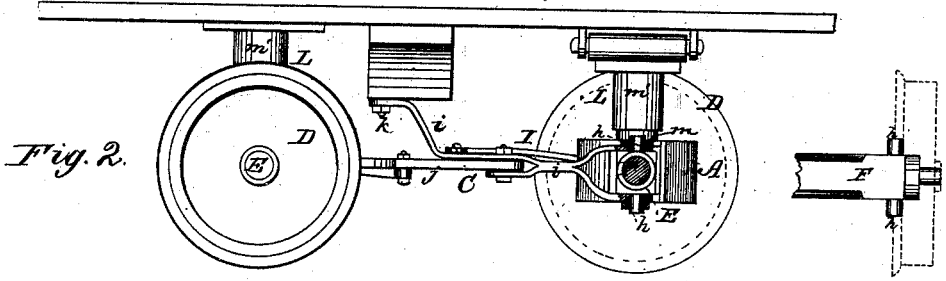
Figure 3:
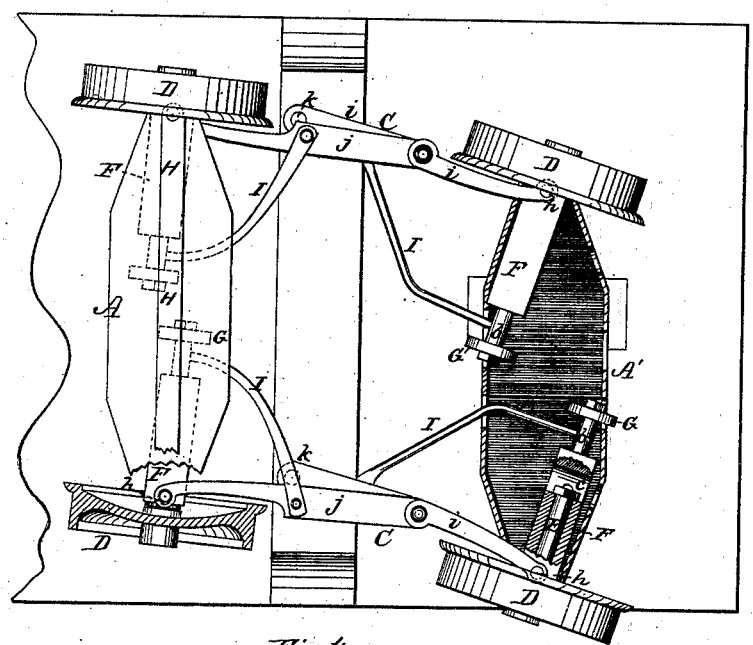
Figure 4:
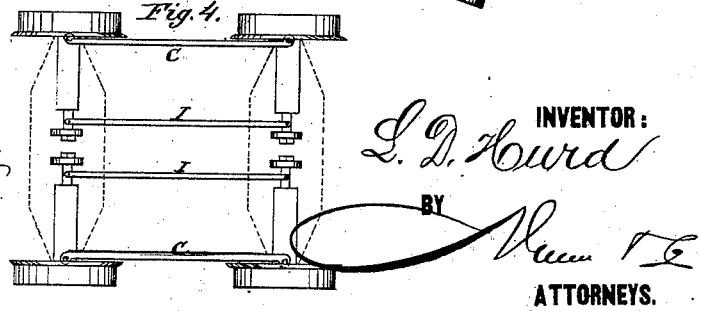

Figure 1 is mainly an end elevation of a truck, part of the movable hollow axle being broken out. Fig. 2 is mainly a side elevation of the same, one axle being in section. Fig. 3 is a bottom-plan view, with same parts in section. Fig. 4 is a modification.

The broad main axles A A' of the truck are constructed hollow and tapered at each end. One axle, A, is fixed, and the other, A', movable—that is to say, capable of shifting endwise, without, however, being thereby thrown out of parallelism to the fixed axle A. These two hollow axles are connected by bars C, which are jointed or made in two parts, as and for a purpose hereinafter set forth.

The wheels D are fixed on short rotating axles E, journaled in sleeves F, that are pivoted at their outer ends to the ends of the main or hollow truck-axles A A', and have friction-rollers G applied to their inner ends $b$. Said axles E are of less length than the sleeves F, and have nuts $c$ screwed on their inner ends, which are accessible through openings in sleeves F and coincident openings $e$ in the sides of the hollow axles A A'. By unscrewing said nuts $c$, the wheels D and their axles E may be detached from the truck, which is important in respect to repair, &c., when required on account of wear or injury, &c.

Gudgeons $h$ are formed on the outer ends of the sleeves F, which enter hardened or steel sockets in the top plate of the hollow axles A A', and in the ends of a bar, H, which extends the length of the latter, and is secured by screws to the under side thereof, so that it may be readily detached when it is required to remove the sleeves F from the hollow axles. The ends of the bars C connecting the latter are forked to adapt them for attachment to the gudgeons $h$ of the sleeves F, as shown.

The hollow or main axles A A' bear upon the extremities of the sleeves F, to wit, upon the pivots $h$ and friction-rollers G. The latter are in contact with the upper plate of the hollow axles, and whenever the truck passes around a curve the axles are turned on their pivots, and the rollers traverse the arcs of circles whose radii are the distance between such rollers and the pivots $h$. The wheels D are made dishing or concave on the inner side, so that the pivots $h$ may be as nearly as practicable in a right line drawn between two opposite points located on the tread or peripheral surface of said wheels, as illustrated in Fig 3. From this construction and arrangement of parts it is obvious the friction and wear of the parts are reduced to a minimum, and all undue weakness of the pivotal connection between the two axles D E entirely avoided.

The bars C are rigidly connected with the inner ends $b$ of the sleeves F by means of curved rods or braces I, which pass through slots in the sides of the hollow thick axles—that is to say, each such brace I connects the inner end of a sleeve, F, with that part or section of the contiguous bar C which is attached to the outer end of such sleeve.

If the bars C were integral, or made in one piece, the endwise-shifting movement of the truck-axle A', in passing around curves, would not permit the rotating axle E or their wheels D on the same side of the truck to be thrown out of parallelism, and consequently the relation of parts in such a case would be as shown in the modification exhibited in Fig. 4, in which the inner ends of each pair of axles E on the same side of the truck are connected by straight bars I, and the bars C are not jointed; but by constructing the bars C in two parts, $i\ j$, which are jointed together, as shown in Figs. 2 and 3, and by extending the part $i$ beyond the joint and securing it by a fixed pivot, $k$, to the bed of the car, it is converted into a lever of the third class, of which the pivot $k$ is the fulcrum, and hence when the truck is passing around a curve, and the axle A' is thereby shifted endwise into the position shown in Fig. 3, the two parts $i\,j$ of each bar C are thrown out of line with each other, and the rotating wheel-axles E of such shifting axles A' are in consequence caused to assume a greater angle to the median line of said axle than the other wheel-axles E with relation to the fixed axle A. In other words, by reason of the joint in bars C, and one of the parts of these having a fixed fulcrum, the pivoted axles E' of the shifting truck-axle A' are thrown out of parallelism with the corresponding or opposite axles E at the same time that the latter are turned at an angle to the hollow axle A, and hence both sets of pivoted rotating axles are caused to assume a position in which they are approximately or nearly parallel to radii of the curve of the track. The obvious result is that the friction, resistance, and wear incident to the passage around a curve of a car having trucks of the usual construction are greatly reduced.

In attaching my improved trucks to a car, the shifting axle A' is put in front, or nearest the end of the car.

The car-body rests on cylindrical pedestals L, which are made in two parts, $m\,m'$, one of which, $m$, fits into the other, $m'$, and abuts or presses against a spring placed therein. The friction between the shifting axle A' and the bed of the car is relieved by suitable friction-rollers, arranged in the arc of a circle, as required.

The pedestals L constitute four bearings or points of support for a car, and hence where the rails are battered, or a short depression otherwise exists in the tread or wearing-surface of the rails, the wheels will pass over it without half of the weight of the car being thrown onto it; whereas, if the truck were connected with the car by a central pivot in the usual way, the wheels on either side of a truck would have to sustain not only half, but even more, of the weight of the car in passing over a depression, since the truck would adjust itself on its pivot.

My improved construction of truck also enables the wheels to pass over small obstructions with less danger of being thrown off the rails than if the truck were swiveled.

What I claim is—

1. The combination, with the fixed and shifting hollow axles and the rotating axles pivoted thereto, of the jointed and braced connecting-bars, one part of which is extended beyond the joint and pivoted to the bed of the car, all arranged substantially as shown and described, for the purpose specified.

2. The combination of the sleeves, having rollers applied to their inner ends, the rotating axles on which the wheels are fixed, and the hollow axles A A', to which said sleeves are pivoted, and bars for connecting the axles, substantially as shown and described.

3. The combination of the sleeves, friction-rollers, and dished wheels, the pivots of the former being located, as specified, with reference to the tread of the wheels and the rotating axles, all as shown and described.

4. The combination, with the pivoted sleeves and hollow axles, of the detachable bottom bar, as shown and described.

The above specification of my invention signed by me this 1st day of June, 1878.

LORENZO D. HURD.

Witnesses:
AMOS W. HART,
SOLON C. KEMON.